UNITED STATES PATENT OFFICE.

GOTTFRIED BURKHARDT, OF BUFFALO, NEW YORK.

IMPROVEMENT IN PROCESSES FOR MANUFACTURING STARCH.

Specification forming part of Letters Patent No. 213,320, dated March 18, 1879; application filed September 2, 1878.

*To all whom it may concern:*

Be it known that I, GOTTFRIED BURKHARDT, of the city of Buffalo, in the county of Erie and State of New York, have invented a new and useful Improved Process for Manufacturing Starch, of which the following is a specification:

My invention relates more especially to a process for manufacturing starch from Indian corn or maize.

The principal object of my invention is to effect the separation of the glutinous matter contained in the kernels of corn from the starchy matter in a dry state, whereby the value of the glutinous matter is greatly increased over that of the wet offal which is produced in manufacturing starch in the ordinary manner, and which is unsalable, except as feed, in the vicinity of the starch-factory.

The nature of my invention will be fully understood from the following description.

In carrying out my improved process, the corn is first ground very high between a pair of suitable stones, so that the inner starchy part of each kernel is reduced to flour, while the surrounding glutinous layer and the husk or bran inclosing it are broken up into coarse pieces. The soft texture of the inner starchy parts of the kernels of corn permits this part of the kernels to be reduced to flour by attrition without grinding the harder glutinous part of the kernels. The chops, consisting of coarse pieces of bran and the glutinous part of the kernels and fine flour, are then separated into three products—the fine flour, the pieces of the hard portions of the kernels, and the bran. This separation is preferably effected by a suitable bolt having two kinds of cloth, so that the flour passes through the first half of the bolt, the coarse particles through the second half of the bolt, and the bran over the tail end thereof. The starch-flour is then steeped in a suitable vat, preferably together with the bran, and, after being thoroughly soaked, the material is reground and treated in the usual manner for separating the bran and the remaining impurities from the starch. The starch so obtained may then be finished for laundry or culinary purposes, or it may be converted into grape sugar or glucose.

The coarse pieces of glutinous matter are ground to meal between a suitable pair of stones, and the product is bolted, so as to separate the remaining starch-flour from the meal. This flour is worked up with the main body of the starch. The corn-meal is in this manner made from the most nutritive part of the kernels and free from starch, whereby it is rendered superior to ordinary corn-meal in nutritive as well as in keeping qualities.

When intended for shipment to distant places, the meal may be dried in a suitable kiln.

By my improved process almost the entire quantity of starch contained in the corn is extracted therefrom; the great bulk of the offal, which is ordinarily disposed of as "wet feed," is converted into corn-meal of a superior quality, and the offal is confined to bran only, and very small in quantity as compared with the amount produced by the various processes now in common use.

My improved process can be carried on with ordinary machinery and appliances at comparatively small expense.

I claim as my invention—

In the manufacture of starch, the process of first grinding the kernels of corn high, whereby the starchy part of each kernel is reduced to flour and the glutinous portion to coarse pieces, then separating these coarse pieces from the starch in a dry state, then grinding these coarse pieces to meal, then bolting the meal, whereby the remaining starch-flour is separated therefrom, and then treating the separated starch-flour with or without the bran, for obtaining the pure starch, substantially as set forth.

G. BURKHARDT.

Witnesses:
EDWARD WILHELM,
CHAS. J. BUCHHEIT.